United States Patent [19]

Odar et al.

[11] Patent Number: 4,721,749

[45] Date of Patent: Jan. 26, 1988

[54] TIRE TREAD COMPOUNDS BASED ON VINYL POLYBUTADIENE

[75] Inventors: Joseph Odar, South Euclid, Ohio; Walter Von Hellens, Bright's Grove, Canada

[73] Assignee: Polysar Limited, Sarnia, Canada

[21] Appl. No.: 912,508

[22] Filed: Sep. 29, 1986

[51] Int. Cl.[4] ............... C08L 7/00; C08L 9/00; C08L 9/06; C08K 3/04
[52] U.S. Cl. ........................ 524/526; 525/236; 525/237
[58] Field of Search ............ 525/236, 237; 524/526

[56] References Cited

U.S. PATENT DOCUMENTS

| | | | |
|---|---|---|---|
| 3,935,180 | 1/1976 | Sogiara et al. | 525/236 |
| 4,370,448 | 1/1983 | Leland | 525/236 |

FOREIGN PATENT DOCUMENTS

| | | | |
|---|---|---|---|
| 757425 | 4/1971 | Belgium | 525/236 |
| 55-29535 | 3/1980 | Japan | 525/236 |
| 55-109233 | 8/1981 | Japan | 525/236 |
| 59-197444 | 11/1984 | Japan | 236/ |

OTHER PUBLICATIONS

Encyclopedia or Polymer Science and Technology, vol. 10, pp. 700–702, John Wiley & Sons, 1969.

*Primary Examiner*—Allan M. Lieberman
*Attorney, Agent, or Firm*—Stevens, Davis, Miller & Mosher

[57] ABSTRACT

Rubber compositions for use in tire tread compounds comprise co-vulcanizable blends of high 1,2 (vinyl) content polybutadiene of high molecular weight and high cis-1,4-poly-butadiene of high molecular weight. The blends show a high degree of homogeneity, so that they act effectively as a single polymer, and exhibit a substantial absence of a glass transition temperature. Both of the polymers in the composition should have a relatively high weight average molecular weight. The relative amounts of the two polymers are such as to obtain a 1,2-group content in the blend of from 35–65 percent (i.e. from 35–65 percent of the polymer units are in the 1,2-configuration). The blend may be compounded with conventional compounding ingredients for curing purposes, and optionally with additional polymers as natural rubber and/or SBR. The vulcanizates of the compositions exhibit a superior and unexpected balance of resilience, traction and wear properties.

11 Claims, No Drawings

TIRE TREAD COMPOUNDS BASED ON VINYL POLYBUTADIENE

FIELD OF THE INVENTION

This invention relates to polymer compositions and processes for their preparation. More particularly, it relates to compositions comprising co-vulcanizable blends of rubbery polymers useful for the manufacture of tire treads, and processes for the preparation of such compositions.

BACKGROUND OF THE INVENTION

Polymer compositions for use in tire treads have an exacting set of technical specifications to meet. The tires are required to have a high degree of traction with respect to both wet and dry surfaces (skid resistance), and to retain their rubbery characteristics over a wide range of temperatures. They must be tough and wear resistant, to stand up to the shock and abrasive forces commonly encountered in service. They should have low hysteresis characteristics, i.e. they should have good rebound characteristics and resilience, to provide low rolling resistance and heat build-up, thereby reducing fuel consumption. Some of these requirements are essentially incompatible with one another, for example, reduced rolling resistance and high wet skid resistance.

At all times, the rubber compositions must be readily processable, to allow for their mixing with regular compounding ingredients, such as carbon black and curing systems, and be sulfur-curable, so as to be economically prepared and manufactured. As the requirements for automobile safety and low fuel consumption become more demanding, the specifications for tire tread rubber compounds become more exacting.

Natural rubber and/or sulfur-curable synthetic rubbery polymers, based upon conjugated diolefinic monomers, are commonly used as the elastomeric polymers in automobile tire tread compositions. Each individual rubbery polymer provides vulcanizates which are deficient in one or more of the physical properties being sought. For example, high cis-1,4-content polybutadiene provides vulcanizates of good wear resistance and good resilience, along with an acceptably low glass transition temperature, so that the vulcanizate retains its rubber properties down to acceptably low temperatures. Such vulcanizates are, however, lacking in both wet and dry traction, except perhaps at very low temperatures, e.g. on ice. High vinyl content polybutadienes, i.e. those having about 70 molar percent of 1,2-content, on the other hand, are deficient in wear resistance and resilience. In addition, the glass transition temperature thereof is too high—i.e. polybutadiene having about 70 molar percent of 1,2-content has a glass transition temperature of about $-33°$ C., which does not permit its use in colder climates.

BRIEF DESCRIPTION OF THE PRIOR ART

It is known to prepare co-vulcanizable blends of rubbery polymers, for use in automobile tire tread compounds, in an attempt to provide a composition with an acceptable balance of properties contributed by the individual rubbery polymers. The deficiencies of high cis-1,4-polybutadienes in traction have previously been recognized. Accordingly, blends thereof with other rubbers such as styrene-butadiene rubbery copolymers (SBR) and high 1,2-content polybutadienes have been proposed.

High 1,2-content polybutadienes, and processes for their preparation, are known in the prior art and the prior art teaches how to control the 1,2-content of the polymer.

Thus, U.S. Pat. No. 3,301,840 Zelinski describes a process for polymerizing conjugated dienes using, as polymerization initiator, an organolithium compound, in a solvent mixture comprising a hydrocarbon and a polar compound such as an ether. The 1,2-content of the polymer is reported to be controllable by adjusting the amount of polar compound in the solvent mixture. The resulting products are vulcanizable rubbery polymers, useful in automobile tires. Polybutadienes, with vinyl contents up to 85 percent, are shown. No specific physical properties, or blends of these rubbery polymers with other polymers, are disclosed.

Kuntz et al, J. Polymer Sci. 1960, Volume 42, p. 299 describes the polymerization of butadiene in n-heptane using low concentrations of butyl-lithium, in the presence and absence of ether (diethyl ether, tetrahydrofuran and methyl tetrahydrofuran).

Canadian Pat. No. 872,308 Osborne et al discloses polymeric compositions comprising blends of rubbery diene polymers (5–95 parts by weight) of low vinyl content (i.e. less than 30 percent) with a rubbery diene polymer having a 1,2-content of more than 30 percent (i.e. up to 80 percent). The high 1,2-content polymers are produced by solution polymerization in the presence of an organolithium initiator and an ether chosen from ethylene glycol dimethyl ether (glyme) and diethylene glycol dimethyl ether (diglyme). The blends may be made by solution blending or mastication on a mill or in an internal mixer.

U.S. Pat. No. 4,224,197 Ueda et al discloses rubbery compositions comprising 3-component blends for use in tire tread compositions. The components are (i) an amorphous polybutadiene having at least 70 percent 1,2-content, in amounts of 20–80 percent by weight; (ii) a polybutadiene rubber having less than 20 percent 1,2-content, in amounts of 10–75 percent by weight; and (iii) either a rubbery SBR, natural rubber or polyisoprene rubber having at least 90 percent cis,1-4-unit content, in amounts of 3–35 percent by weight.

U.S. Pat. No. 4,321,168 Ueda et al discloses a process for preparing tire tread compositions of improved rolling resistance and wet-skid resistance, which comprises compounding with carbon black in a two stage process a rubbery blend of 25–75 weight percent of polybutadiene having 65–90 mole percent 1,2-content and 75–25 weight percent of natural rubber of high cis-1,4-content polyisoprene.

SUMMARY OF THE INVENTION

It is an object of the present invention to provide novel rubbery compositions of use in tire tread compounds.

It is a further object of the invention to provide such compositions which, after sulphur vulcanization, will provide vulcanizates of improved resilience characteristics, and good wear and traction characteristics.

It is a further object of the present invention to provide vulcanizates of such rubbery compositions which retain their rubbery characteristics over a wide range of temperatures.

It is a further object of the present invention to provide a process for preparing such rubbery compositions and vulcanizates thereof.

It has now been found that, contrary to previous indications and expectations, rubbery compositions which are sulphur vulcanizable to produce tire tread compounds having a very desirable balance of low rolling resistance as evidenced by rebound and hysteresis characteristics, high wet and dry skid resistance and high wear resistance, can be prepared by mixing together, in suitable proportions, a high 1,2-content polybutadiene and a high cis,1-4-content polybutadiene, provided that both polymers are of substantially similar, high molecular weight, and that a suitably intimate and homogeneous mixture of these polymers is achieved.

Thus, from one aspect, the present invention provides a sulphur vulcanizable blend of a first rubbery polymer and a second rubbery polymer, said first rubbery polymer comprising a substantially amorphous polybutadiene having at least 70 mole percent 1,2 units in its microstructure, and having a weight average molecular weight of from about 300,000 to about 550,000, said second rubbery polymer comprising a substantially amorphous polybutadiene having from about 92 to about 99 mole percent cis-1,4 units in its microstructure, and having a weight average molecular weight of from about 300,000 to about 550,000; the relative proportions of said first and second polymers being such that the overall 1,2 unit content of the blend is from about 35 percent to about 65 percent on a molar basis, and the molecular weight distribution, as determined by gel permeation chromatography, of the blend is characterized by Mw/Mn being from about 2 to about 3.5; the first and second polymers being sufficiently intimately and homogeneously blended together that the resultant blend exhibits a substantial absence of a glass transition temperature.

The blends according to the present invention exhibit a very high degree of homogeneity, derived from the achievement of a very intimate mutual dispersion of the two polymers. The net result is an overall enhancement of the general physical properties of vulcanizates of the blend, as if they were derived from polymers of much higher molecular weights, but without the problems of processability normally encountered with polymers of such higher molecular weight. Whilst it is not intended that the invention should be limited to any particular theory or mode of action, it is as if some molecular interaction takes place between the polymers in the blend, when the necessary intimate degree of mixing has been accomplished between the specified polymers. This leads to vulcanizate properties which one would expect to obtain as if there were higher effective molecular weights in the blend, with consequent improvements in physical properties, without losing the desirable processability of the individual polymers. These improved physical properties manifest themselves essentially in terms of increased wear resistance and resilience, which are substantially as good as those attainable by using high cis-1,4-content polybutadiene alone, and decreased rolling resistance and improved wet and dry traction, which are characteristic of the high vinyl content of polybutadiene, but without the normal processability problems and unsatisfactory glass transition temperatures normally associated with such high vinyl content polybutadiene of comparable molecular weight.

In order to obtain blends of the necessary intimate dispersion to give the improved physical properties, the rubbery polymer constituents thereof must be of similar high weight average molecular weights, in the range of Mw from about 300,000 to about 550,000, and must be mixed in proportions so that the blend has a narrow molecular weight distribution, characterized by Mw/Mn of from about 2 to about 3.5. An especially preferred method of achieving the vulcanizable rubbery polymer blends of the necessary degree of intimate dispersion is by blending of solutions of the respective polymers in the same or at least mutually compatible solvents, and then co-agglomerating and recovering the blend of polymers from the mixed solution.

Thus, according to a further aspect of the present invention, there is provided a process for preparing sulfur vulcanizable rubbery polymer blends, which comprises mixing together a solution of a first rubbery polymer and a solution of a second rubbery polymer, the solvent of such solution being the same or different and if different being mutually compatible, said first polymer comprising a substantially amorphous, high molecular weight polybutadiene, having at least 70 mole percent of 1,2 units in its microstructure, and having a molecular weight of from about 300,000 to about 550,000; the concentrations of said solutions and the relative proportions thereof being sufficient to give a blend of said first and second polymers having an overall 1,2 unit content of from about 35 percent to about 65 percent on a molar basis, and a molecular weight distribution of the blend characterized by Mw/Mn being from about 2 to about 3.5; and co-agglomerating and recovering the polymers from said solution in intimate homogeneous dispersion.

DESCRIPTION OF THE PREFERRED EMBODIMENTS

The high 1,2 content polybutadiene, used as the first rubbery polymer according to the present invention, has at least about 70 mole percent, preferably at least 80 mole percent and preferably not more than about 90 mole percent of its polymerized units in the 1,2 configuration. Preferably the 1,2-polybutadiene has essentially no crystallinity. In order to provide rubbery blends with the necessary overall vinyl content, it is preferred to mix about 75 to 45 percent by weight of such high vinyl polybutadiene with about 25 to 55 percent by weight of the high cis-1,4-polybutadiene.

High 1,2-content polybutadienes are known rubbery materials and can be prepared by processes such as described in U.S. Pat. No. 3,301,840 Zelinski. Typically, such polymers are prepared by a process which involves solution polymerization at about room temperature (i.e. about 20° C. to about 30° C.) of butadiene in a hydrocarbon solvent using an organolithium initiator, in the presence of a polar compound such as an ether. The butadiene concentration may be from about 10 to about 30, preferably from about 15 to about 25, weight percent based on butadiene plus solvent. Suitable solvents for the polymerization include the aliphatic alkanes such as pentane, hexane, heptane and the like, the cycloalkanes such as cyclohexane, aromatic hydrocarbons such as benzene and toluene and mixtures of the aforesaid with each other or with butenes such as butene-1. A suitable mixture is cyclohexane and butene-1. The preferred ethers in the preparation of these polymers for use in the present invention, are glyme (ethylene glycol dimethylether) and diglyme (diethylene glycol dimethyl ether), since only very small amounts of these ethers are required to give the required high vinyl content. The proportion of 1,2 units in the resulting polymer is controllable by adjusting the molar ratio of the ether to the organolithium initiator. Polybutadienes with 1,2-contents as high as 90 mole percent can be obtained. For use in the present invention, it is preferred that this 1,2-content be as high as possible. The molar ratio of glyme or diglyme to lithium is suitably from about 1.5:1 to about 3.5:1. The molecular weight of the resulting polymers is controllable by adjusting the amount of organolithium initiator in relation to the amount of monomer, the smaller the molar ratio of organolithium initiator to monomer, the higher the molecular weight of the resulting polymer. Monofunctional organolithium initiators, such as n-butyl lithium, sec-butyl lithium and t-butyl lithium, are preferred, but the difunctional organolithium initiators are also suitable for use. The molecular weight distribution of suitable polymers is characterized by Mw/Mn being from about 1.1 to about 1.8, preferably from about 1.4 to about 1.7. The weight average molecular weight of suitable polymers is preferably from about 300,000 to about 550,000, although weight average molecular weights as high as about 650,000 are also acceptable.

High cis-1,4-content polybutadienes are also well known and widely used synthetic rubbery polymers. They can be produced by solution polymerization of butadiene monomer, using, for example, a cobalt salt or organo-cobalt compound and an aluminum alkyl compound, as catalyst. Preferred such rubbery polymers to be used in the present invention have a cis-1,4-content of at least 95 mole percent, most preferably from about 97 to about 99 mole percent. They are readily available in commercial quantities on the market. A preferred such cis-1,4-polybutadiene may be prepared by the polymerization of butadiene-1,3 in a benzene-butene-1 or cyclohexane-butene-1 diluent in the presence of cobalt octoate, aluminum diethyl monochloride and water. The butadiene-1,3 concentration may be from about 10 to about 25 weight percent based on monomer plus diluent and the polymerization temperature may be from about 10° to about 27° C. The molecular weight distribution (Mw/Mn) of suitable polymers is preferably from about 2.5 to about 3.5, preferably from about 2.7 to about 3.2.

The rubbery polymer blends of the present invention are further characterized by a substantial absence of a glass transition temperature. In the procedure for the determination of the glass transition temperature, the present polymer blends exhibit either a complete absence of a transition or a very indistinct and blurred indication of a transition which the experts consider to be not indicative of a true transition. The glass transition temperatures characteristic of the two individual components are markedly different from one another. As noted, polybutadiene having a vinyl content of about 70 mole percent has a glass transition temperature of about −33° C., and that of a polymer having about an 85 percent molar vinyl content is about −20° C. The high cis-1,4 content polybutadienes making up the second component of the blend of the present invention have glass transition temperatures of about −100° C. to about −107° C. It is therefore very surprising that the present polymer blends should be characterized by a substantial absence of a glass transition temperature. It is believed that the very high degree of homogeneity of the blend may have a bearing on this phenomenon.

In addition, the rubbery polymer blends according to the present invention are so intimately and homogeneously mixed that they behave on processing and compounding as if they were a single rubbery polymer having fairly good processability characteristics. Thus, on mechanical mixing with reinforcing agents such as carbon black, e.g. on a mill or in an internal mixer the carbon black disperses throughout the blend, and does not show a preference for blending with one polymer as opposed to the other. When an insufficient degree of homogeneity in the polymer blend is achieved, the carbon black tends to admix with the high cis-1,4 content polybutadiene preferentially. A preferred method of achieving this necessary degree of homogeneity is by solution blending.

Solution blending of the polymers to form the blend of the present invention is suitably achieved using solutions of the polymers in mutually compatible hydrocarbon liquid solvents. Since both of the polymers are prepared by solution polymerization in hydrocarbon solvents, the blends can, if desired, be prepared by solution blending of the polymer cements produced in the polymerization process, without recovering the polymers therefrom. Alternatively the two polymers in dry solid form are dissolved separately in the same or compatible hydrocarbon solvents (e.g. hexane, heptane, octane, cyclohexane, benzene, toluene, etc.) to the desired concentration, and then mixed together in the predetermined proportions to give a polymer blend of the required total vinyl content. The dissolution for the polymers and the subsequent solution blending suitably takes place at room temperatures or slightly elevated temperatures, under agitation. It is most convenient to mix approximately equal volumes of the two solutions, and to adjust the proportions of the respective polmers in the final blend by adjusting the concentration of each polymer in the individual solutions. The polymer blend may be recovered from solution by standard recovery techniques of solvent removal and drying.

The polymer blends of the present invention may be compounded with conventional rubber compounding ingredients by standard rubber mixing techniques, as noted above. They may be oil extended by addition of appropriate amounts of the well known hydrocarbon oils. Stabilizers, anti-oxidants, tackifiers, bonding agents, etc., as well as including one or more types of carbon black reinforcing agents, are also added in the usual way and in the normal amounts for compounding polybutadiene. It is a feature of the blends of the present invention that they behave on compounding as if they were a single rubbery polymer. Moreover, vulcanizates of the blends exhibit physical property characteristics which are somewhat different from those of vulcanizates of the individual polymers and which do not appear to be calculated or expected balance of properties derived from the individual components of the blend but rather are an unexpected and superior balance of resilience, traction and wears properties. These features derive from the high degree of intimacy and homogeneity of the blend.

Additional unsaturated rubbery polymers may be added to the blends of the present invention if desired. Any such additional rubbery polymers should be compatible and co-vulcanizable with the rubbery polymers of the blend and may include styrene-butadiene (SBR) polymers or natural rubber. Any such additional rubbery polymer is suitably added during the conventional compounding process by mixing in an internal mixer or on a mill.

The rubbery polymer blends according to the invention may be cured with conventional sulfur based curative systems, to prepare vulcanizates of the improved physical properties described herein. Sulphur, accelerators, etc. are added to the blend in the usual amounts, thoroughly mixed in, and the compounds heated in a mold in the usual way to prepare the vulcanized articles.

The invention is further described, for purposes of illustration, in the following specific examples.

EXAMPLE 1

High vinyl content polybutadienes were prepared by polymerization of butadiene in solution using n-butyl lithium as polymerization initiator, in the presence of diglyme. All materials were high purity and were suitably dried before use, such as by passage over molecular sieves or by distillation over butyl lithium, using methods well known in the art. At the end of polymerization, the polymer was recovered from solution by addition of ethyl alcohol to cause polymer precipation, followed by solvent stripping and drying. The microstucture of the polymers was determined by IR spectroscopy. Molecular weights were determined both from solution viscosity (DSV) and gel permeation chromatography (GPC) measurements. Molecular weight distribution of the polymers was calculated from the gel permeation chromatography measurements. The polymerization conditions and results of analysis of the polymers are given below in Table 1 in which DSV means the dilute solution viscosity determined at 30° C. using a solution of 0.3 g of polymer in 100 ml of toluene and the microstructure results are mole percent. The amounts of diglyme and butyl lithium are expressed as parts by weight per 100 parts by weight of monomer (butadiene). Experiments #10 and #11 record the properties of cis-1,4-polybutadiene typical of that used in the subsequent examples.

EXAMPLE 2

High vinyl content polybutadienes, prepared as described in Example 1, were solution-blended with high cis-1,4-polybutadiene (TAKTENE ® 1203) using hexane as common solvent, the solid rubbery polymer blends recovered and subjected to analysis. The cis-1,4-polybutadiene properties were as shown in Table 1. The characteristics of the rubbery polymer blends are shown in Table 2. Some of the blends were oil extended with an aromatic oil (CIRCOSOL ® 4240) and the properties shown are of the polymer blend without the oil present. In Table 2, VBR stands for the 1,2 polybutadiene of Table 1 and CBR stands for the cis-1,4-polybutadiene of Table 1. The proportions in the blends are all by weight.

These blends were then compounded in the recipe given below, all parts being by weight:

| Polymer | 100 |
|---|---|
| Carbon black (N-330) | 60 |
| Naphthenic oil (CIRCOSOL 4240) | 15 |
| Zinc oxide | 3 |
| Stearic acid | 2 |
| Sulphur | 1.5 |
| N—t-Butyl-2-benzothiazole sulphenamide | 0.9 |

These compounds were vulcanized by heating at 166° C. for 30 minutes and the vulcanizate properties were determined using standard ASTM procedures, the results being given in Table 3, where the Polymer number is taken from Table 1 for Experiment #31 as the control (cis-1,4-polybutadiene) and from Table 2 for Experiment #'s 32 to 37 as blends of the invention.

To further indicate the utility of the blends of the invention, they were compounded in the recipe given below (all parts being by weight) which is typical of the type of compound used to manufacture the tread of a passenger car tire.

|  | Control | Experiment |
|---|---|---|
| SBR 1712 | 103.13 | 34.38 |
| Cis-1,4-polybutadiene | 25 | 25 |
| Polymer blend | 0 | 50 |
| Carbon black (N-339) | 65 | 65 |
| Aromatic oil (SUNDEX 790) | 6.87 | 25.62 |
| Antioxidant (SANTOFLEX 13) | 1.3 | 1.3 |
| Zinc oxide | 3 | 3 |
| Stearic acid | 1 | 1 |
| Sulphur | 2 | 2 |
| N—t-Butyl-2-benzothiazole sulphenamide | 1.1 | 1.1 |
| Diphenyl guanidine | 0.4 | 0.4 |

SBR 1712 is a polymer in which for every 137.5 parts by weight there are 100 parts by weight of polymer and 37.5 parts by weight of oil. In the Experiment recipe, the total oil has been maintained constant and the 50 parts of the polymer blend replace 50 parts of the SBR in the 1712.

These compounds were vulcanized by heating at 166° C. for 30 minutes and the vulcanizate properties were determined using ASTM or other well known standard procedures, the results being given in Table 4, the polymer blend number being the polymer blend of Table 2.

The Gehman test conducted on the vulcanizates is a standard test to determine the stiffness and flexibility of a rubber vulcanizate at decreasing temperature. It reports the temperature, in degrees C., at which the torque required to twist a sample of the vulcanizate is the respective multiple of the torque required to effect the same twist in the sample at 25° C. Thus, the T2 value is the temperature at which the required torque is twice that at room temperature, T5 value is the temperature at which the torque is five times room temperature value, etc. The most desirable vulcanizates for tire tread use are those which retain their flexibility down to very low temperatures, i.e. those for which the Gehman temperatures at the high T values are very low.

The tan delta test is also a standard test performed on rubber vulcanizates, and is an indication of the hysteresis power loss in the vulcanizate as it flexes. Measurements of tan delta at different temperatures give curves whose shape provides an indication of the performance of the vulcanizate with respsect to traction and rolling resistance. According to the WLF principle, the tan delta measurements at different temperatures can be related to the hysteresis losses in the vulcanizate when subjected to flexing at different frequencies. High temperature measurements indicate hysteresis losses on flexing at low frequencies. Rolling resistance is a low frequency flexing phenomenon, whereas traction is a high frequency flexing phenomenon. An ideal rubber vulcanizate for tire tread use has a high value of tan delta at 0° C., indicating good traction, and a low value of tan delta at 56° and 100° C., indicating low rolling resistance.

The Akron Abrasion is determined by rotation of a rubber wheel against a standard grinding wheel and comparing the weight loss to that of a standard rubber wheel. The test is conducted at two angles of contact. Because the standard rubber wheel wear resistance on abrasion is set at 100 percent, the higher the number the better the resistance to wear. The DIN Abrasion is a standard test DIN 53516, the volume of rubber abraded being reported. Thus, the lower the number the better the resistance to wear.

A review of the data presented in Table 2 indicates that, for the non-oil extended blends, the Mooney viscosity of the blends is considerably higher than would be anticipated from a consideration of the Mooney viscosities of the individual polymers of the blend. However, all of the polymer blends reported in Table 2 no difficulty was experienced in achieving a homogeneous dispersion of the carbon black reinforcing agent throughout the blend.

The figures for tan delta for all of the polymer blends are noteworthy. In each case, there is a high tan delta value at 0° C., and a much lower tan delta value at 56° C. and at 100° C. compared to the control. The experimental vulcanizates will exhibit lower rolling resistance (i.e. lower tan delta at 56° C. and 100° C.) and improved traction (i.e. higher tan delta at 0° C.). The results of the abrasion tests indicate that the vulcanizates, according to the invention will exhibit improved wear (i.e. higher Akron Abrasion and lower DIN Abrasion results). The results of the Gehman tests indicate that the experimental vulcanizates retain their flexibility at temperatures lower than the control.

TABLE 1

| Experiment # | 1 | 2 | 3 | 4 | 5 | 6 | 7 | 8 | 9 | 10 | 11 |
|---|---|---|---|---|---|---|---|---|---|---|---|
| Butadiene g | 100 | 100 | 100 | 100 | 100 | 100 | 100 | 100 | 100 | — | — |
| Cyclohexane g | 358 | 358 | 358 | 358 | 350 | 350 | 350 | 253 | 253 | — | — |
| Butene-1 g | 119 | 119 | 119 | 119 | 120 | 120 | 120 | 84 | 84 | — | — |
| Diglyme phm | 0.0996 | 0.0807 | 0.0807 | 0.0653 | 0.129 | 0.129 | 0.129 | 0.11 | 0.11 | — | — |
| n-Butyl lithium phm | 0.0217 | 0.0176 | 0.0176 | 0.0118 | 0.0206 | 0.0206 | 0.0206 | 0.0175 | 0.0175 | — | — |
| Polymerization temperature °C. | 26 | 26 | 26 | 26 | 26 | 26 | 26 | 26 | 26 | — | — |
| Polymer Properties DSV | 3.29 | 3.75 | 3.03 | 4.55 | 3.78 | 4.04 | 3.53 | 2.98 | 2.88 | 2.1 | 1.85 |
| Mooney viscosity (ML 1 + 4 at 100° C.) | 65 | 57 | 69 | 55 | 61 | — | 62 | 74 | 73 | 42 | 43 |
| Cis-1,4 mole % | 8 | 9 | 7 | 10 | 7 | 9 | 7 | 10 | 9 | 98.6 | 96.7 |
| Trans-1,4 mole % | 8 | 10 | 11 | 11 | 9 | 10 | 9 | 8 | 9 | 0.5 | 1.6 |
| Vinyl mole % | 84 | 81 | 82 | 79 | 84 | 81 | 84 | 82 | 82 | 0.9 | 1.7 |
| From Gel permeation chromatography | | | | | | | | | | | |
| $Mn \times 10^{-3}$ | 377 | 467 | 352 | 492 | 390 | 434 | 366 | 281 | 307 | 139 | 103 |
| $Mw \times 10^{-3}$ | 454 | 527 | 407 | 662 | 570 | 613 | 526 | 447 | 423 | 419 | 411 |
| Mw/Mn | 1.2 | 1.1 | 1.2 | 1.3 | 1.5 | 1.4 | 1.4 | 1.6 | 1.4 | 3.0 | 4.1 |

TABLE 2

| Experiment # | 21 | 22 | 23 | 24 | 25 | 26 | 27 | 28 | 29 |
|---|---|---|---|---|---|---|---|---|---|
| VBR # | 1 | 2 | 3 | 4 | 5 | 6 | 7 | 8 | 9 |
| Amount | 46 | 48 | 75 | 50 | 60 | 70 | 50 | 49 | 46 |
| CBR # | 10 | 10 | 10 | 10 | 11 | 11 | 11 | 10 | 10 |
| Amount | 54 | 52 | 25 | 50 | 40 | 30 | 50 | 41 | 39 |
| Oil Amount | — | — | — | — | — | — | — | 11 | 15 |
| Blend Properties | | | | | | | | | |
| DSV dl/g | 3.2 | 3.41 | 3.06 | 3.41 | 3.17 | 3.23 | 2.72 | 2.42 | 2.34 |
| Mooney viscosity (ML 1 + 4 at 100° C.) | 86 | 88 | 104.5 | 97 | 91 | 106 | 79 | 64 | 57 |
| Cis-1,4 mole % | 58 | 57 | 30 | 54 | 49 | 37 | 56 | 52 | 54 |
| Trans-1,4 mole % | 3 | 2 | 6 | 4 | 4 | 6 | 3 | 3 | 3 |
| Vinyl mole % | 39 | 41 | 64 | 42 | 47 | 57 | 41 | 45 | 43 |
| $Mn \times 10^{-3}$ | 181 | 226 | 218 | 202 | 171 | 191 | 151 | 180 | 235 |
| $Mw \times 10^{-3}$ | 443 | 536 | 429 | 492 | 472 | 494 | 438 | 372 | 439 |
| Mw/Mn | 2.4 | 2.4 | 2.0 | 2.4 | 2.8 | 2.6 | 2.9 | 2.1 | 1.9 | processed simply and easily in the banbury mixer, and

TABLE 3

| Experiment # | 31 | 32 | 33 | 34 | 35 | 36 | 37 |
|---|---|---|---|---|---|---|---|
| Polymer # | 10 | 21 | 22 | 25 | 26 | 27 | 28 |
| Hardness Shore A | 55 | 62 | 61 | 60 | 61 | 59 | 63 |
| 100% Molulus MPa | 1.7 | 2.2 | 2.2 | 2.1 | 1.9 | 1.9 | 2.5 |
| 300% Modulus MPa | 7.6 | 11.6 | 12.0 | 13.6 | 13.1 | 7.8 | — |
| Tensile Strength MPa | 14.3 | 15.0 | 12.6 | 15.6 | 16.2 | 14.5 | 11.8 |
| Elongation % | 460 | 350 | 310 | 340 | 340 | 280 | |
| Gehman T2 °C. | −22.5 | −24 | −24.3 | −20.3 | −19.3 | −21.8 | −18.8 |
| T5 °C. | −26.5 | −29.2 | −29.3 | −25 | −23.5 | −27 | −23.5 |
| T10 °C. | −32.8 | −32.4 | −32.5 | −28.8 | −25.8 | −30.5 | −27.5 |
| T100 °C. | −65.8 | −56 | −57.3 | −48.8 | −42.3 | −53 | −53.3 |
| Tan Delta at 0° C. | 0.158 | 0.49 | 0.61 | 0.67 | 0.94 | 0.57 | 0.71 |
| at 56° C. | 0.159 | 0.128 | 0.129 | 0.124 | 0.135 | 0.134 | 0.119 |
| at 100° C. | 0.162 | 0.112 | 0.11 | 0.102 | 0.104 | 0.115 | 0.105 |

TABLE 4

| Experiment # | 41 | 42 | 43 | 44 | 45 | 46 | 47 | 48 | 49 |
|---|---|---|---|---|---|---|---|---|---|
| Polymer Blend # | Control | 21 | 22 | 23 | 24 | 25 | 26 | 27 | 28 |
| Hardness Shore A | 61 | 58 | 58 | 61 | 61 | 58 | 57 | 58 | 59 |
| 100% Molulus MPa | 1.8 | 1.8 | 1.7 | 2.0 | 1.6 | 1.6 | 1.4 | 1.4 | 1.6 |
| 300% Modulus MPa | 9.9 | 9.4 | 9.1 | 9.9 | 8.9 | 10.1 | 9.0 | 8.9 | 9.3 |
| Tensile MPa | 21.3 | 15.6 | 15.0 | 14.2 | 17.3 | 17.6 | 17.4 | 16.7 | 17.1 |
| Elongation % | 510 | 420 | 390 | 460 | 425 | 450 | 450 | 440 | |
| Akron Abrasion 15° % | 149 | 159 | 232 | 181 | 178 | 250 | 176 | 231 | 273 |
| 20° % | 131 | 244 | 247 | 183 | 208 | 120 | 120 | 141 | 145 |
| DIN Abrasion mm$^3$ | 105 | 96 | 79 | 107 | 79 | 85 | 74 | 67 | 65 |
| Gehman T2 °C. | −31.5 | −26.5 | −28.8 | −24 | −26.3 | −23 | −22.3 | −22.3 | −23 |
| T5 °C. | −44.5 | −35 | −36.8 | −30 | −35.5 | −28.5 | −30.3 | −33.5 | −33.3 |
| T10 °C. | −48.5 | −42.5 | −46 | −34.8 | −43.3 | −33.5 | −36.3 | −42.3 | −42.5 |
| T100 °C. | −58.3 | −67.3 | −69.3 | −59.6 | −68.8 | −61 | −63 | −64.5 | −67.3 |
| Tan Delta at 0° C. | 0.277 | 0.39 | 0.40 | 0.49 | 0.39 | 0.51 | 0.47 | — | 0.45 |
| at 56° C. | 0.176 | 0.152 | 0.153 | 0.149 | 0.156 | 0.145 | 0.145 | — | 0.129 |

What is claimed is

1. A sulfur vulcanizable blend of a first rubbery polymer and a second rubbery polymer, said first rubbery polymer comprising a substantially amorphous polybutadiene having at least 70 and not more than about 90 mole percent 1,2 units in its microstructure and having a weight average molecular weight of from about 300,000 to about 550,000;

said second rubbery polymer comprising a substantially amorphous polybutadiene having from about 92 to about 99 mole percent cis-1,4 units in its microstructure and having a weight average molecular weight of from about 350,000 to about 550,000;

the relative proportions of said first and second polymers being such that the overall 1,2 unit content of the blend is from about 35 percent to about 65 percent on a molar basis;

the molecular weight distribution, as determined by gel permeation chromatography, of the first rubbery polymer being characterized by Mw/Mn being from about 1.1 to about 1.8, of the second rubbery polymer being characterized by Mw/Mn being from about 2.5 to about 3.5 and of the blend being characterized by Mw/Mn being from about 2 to about 3.5;

the first and second polymers being sufficiently intimately and homogeneously blended together that the resultant blend exhibits a substantial absence of a glass transition temperature.

2. The rubbery polymer blend of claim 1 comprising 75 to 45 percent by weight of said first rubbery polymer and 25 to 55 percent by weight of said second rubbery polymer.

3. The rubbery polymer blend of claim 2 further including carbon black reinforcing agent, in an amount of from about 20 to about 50 parts by weight per 100 parts by weight of total rubber, intimately and homogeneously dispersed throughout the blend.

4. The rubbery polymer blend of claim 3 further including a hydrocarbon oil compatible with the first rubbery polymer and the second rubbery polymer, in amounts of from about 5 to about 25 parts by weight per 100 parts by weight of total rubber.

5. The rubbery polymer blend of claim 3 further including a third compatible rubbery polymer selected from the group consisting of SBR and natural rubber.

6. Sulfur vulcanizates of the rubbery polymer blend of claim 3.

7. Sulfur vulcanizates of the rubbery polymer blend of claim 4.

8. Sulfur vulcanizates of the rubbery polymer blend of claim 5.

9. A process for preparing the sulfur vulcanizable rubbery polymer blend of claim 1 which comprises mixing together solutions of said first and second polymers in mutually compatible solvents, in relative proportions and concentrations so as to obtain a blend of rubbery polymer having a 1,2 unit content of from about 35 to about 65 percent on a molar basis and a molecular weight distribution characterized by Mw/Mn being from about 2 to about 3.5;

and co-agglomerating and recovering the rubbery polymers from solution as an imtimate, homogeneous blend.

10. The process of claim 9 wherein the same solvent is used for both the first rubbery polymer and the second rubbery polymer.

11. The process of claim 10 wherein said solvent is hexane.

* * * * *